March 15, 1960
R. E. KLAUSS ET AL
2,928,303
SPRING DRIVEN ROLLER MEANS FOR REMOVING CUT WORK FROM CUTTING DIE
Filed July 18, 1957
2 Sheets-Sheet 1
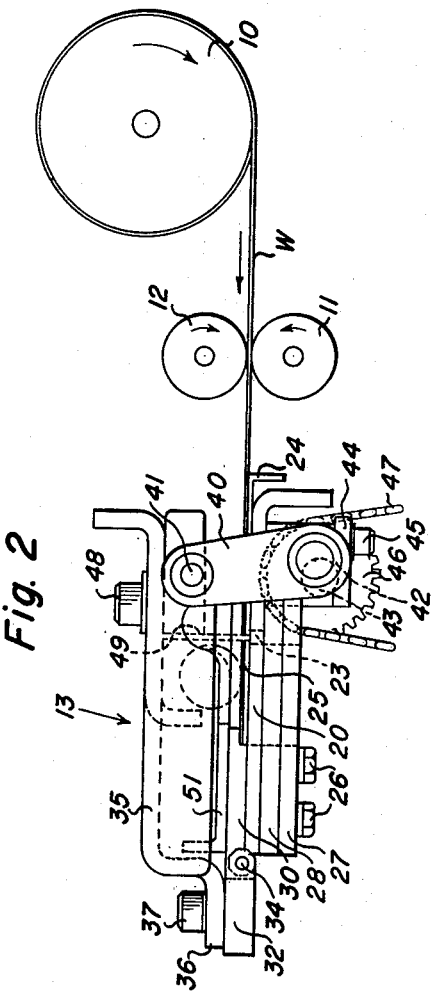
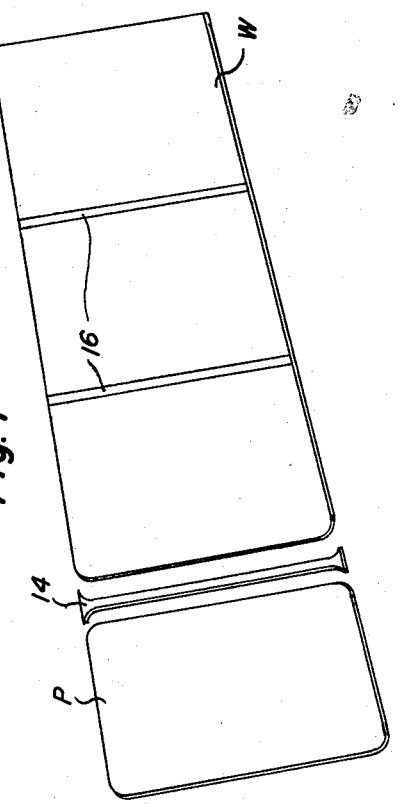
RALPH E. KLAUSS
JOHN W. WARD
INVENTORS
BY
ATTORNEY

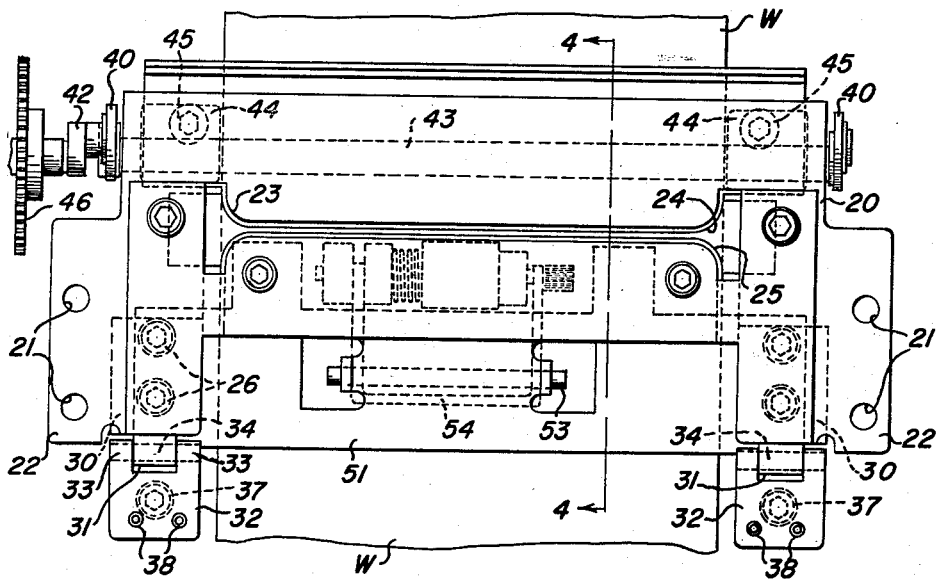
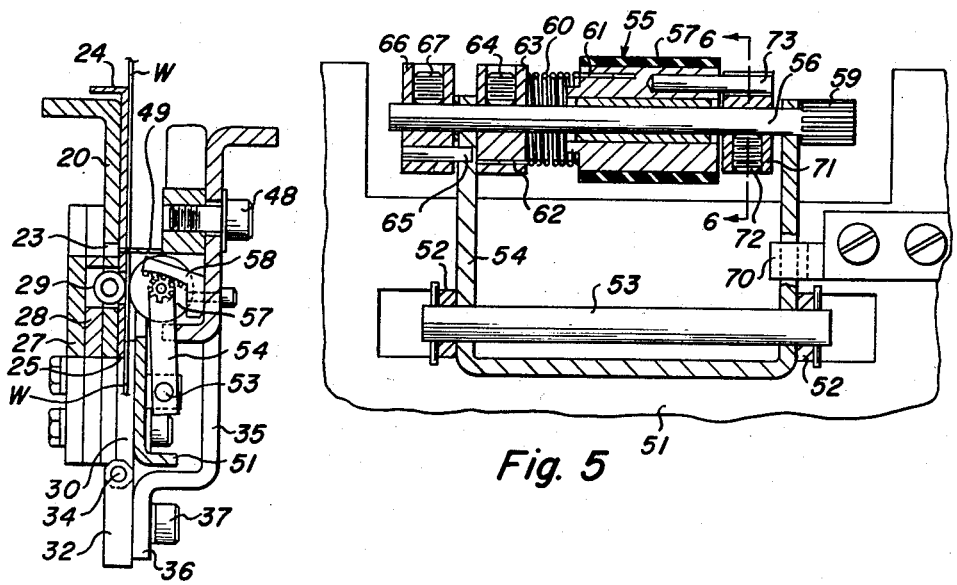
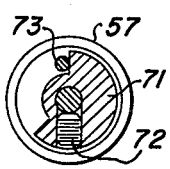

sentence=United States Patent Office 2,928,303
Patented Mar. 15, 1960

2,928,303

SPRING DRIVEN ROLLER MEANS FOR REMOVING CUT WORK FROM CUTTING DIE

Ralph E. Klauss, Webster, and John W. Ward, Rochester, N.Y., assignors to Eastman Kodak Company, Rochester, N.Y., a corporation of New Jersey Application July 18, 1957, Serial No. 672,686

4 Claims. (Cl. 83—129)

The present invention relates to a die assembly used to cut sheets from the end of a continuous web, and particularly to the combination with such a die assembly of a sheet-ejecting mechanism for automatically ejecting a sheet from the assembly as it is severed from the end of the web.

While this die assembly can be used for cutting sheets of a given size and shape from the end of any continuous web, it was particularly designed to cut photographic prints to length from a continuous strip of processed prints and to cut round corners on each print. This requires a punch and die operation wherein the severed print tends to remain in the die assembly and must be ejected from the same to permit the end of the strip to be fed into the die assembly with no interference. This problem does not arise in the ordinary print chopper where the prints are chopped from the end of a strip of prints by reciprocating shear blades, because in such choppers the severed print falls away from the path of feed of the strip as it is cut off.

The primary object of the present invention is to provide a die assembly for intermittently cutting sheets from the end of a web intermittently fed thereto and having a sheet-ejecting mechanism combined therewith which automatically ejects the cutoff sheet from the die assembly as it is severed from the web.

A further object is to provide a sheet-ejecting mechanism of the type described which is so designed and combined with the die assembly that it is moved to and from operative position relative to the sheet to be severed and cocked or tensioned by the normal reciprocal movement of the movable member of the die assembly.

And yet another object is to provide a sheet-ejecting mechanism of the type set forth which comprises a rubber covered roller movable into contact with the sheet to be severed and which is adapted to be spring driven to eject the sheet when it is severed. The roller is connected to the movable member of the die assembly so as to be bodily moved to and from contact with the end of the web as the movable die member moves to and from, respectively, its cutting position, and in such a way that the spring for driving the roller is tensioned after the roller contacts the end of the web by movement of the die member through its cutting stroke.

The novel features that we consider characteristic of our invention are set forth with particularity in the appended claims. The invention itself, however, both as to its organization and its methods of operation, together with additional objects and advantages thereof, will best be understood from the following description when read in conjunction with the accompanying drawings, in which:

Fig. 1 is a perspective view showing how photographic prints having round corners are adapted to be cut from the end of a continuous strip of prints by the die assembly of the present invention;

Fig. 2 is a side elevational view showing a die assembly constructed in accordance with a preferred embodiment of the present invention in association with means for intermittently feeding a continuous strip of prints thereto;

Fig. 3 is an enlarged bottom plan view of the die assembly shown in Fig. 2 and showing the shape of the stationary die members and the location of the print ejecting mechanism combined therewith;

Fig. 4 is a sectional view taken substantially on line 4—4 of Fig. 3 and showing the operative connection between the sheet-ejecting mechanism and the movable member of the die assembly;

Fig. 5 is an enlarged sectional view showing the sheet-ejecting mechanism; and

Fig. 6 is a sectional detail taken substantially on line 6—6 of Fig. 5.

Generally speaking, the die assembly constituting the present invention, and which is adapted to be detachably connected to commercially available print cutters in place of the customary shear blades, consists essentially of a reciprocal punch, two stationary die plates with which the punch cooperates to make a transverse cut with round corners, an eccentric shaft, a pair of hinges and a sheet-ejecting mechanism. After the print or sheet is cut off from the end of the strip or web, it must be ejected from the die to allow the next print or sheet on the web to be advanced into the die, and it is this ejection mechanism and its combination with the die assembly which we believe constitutes the novel features of the present invention.

Referring now to the drawings, and particularly Figs. 1 and 2, a continuous strip of prints or a plain web W is intermittently fed from a supply roll 10 by any suitable means, here indicated as rollers 11 and 12, and into a die assembly, indicated generally by reference numeral 13, where the end print or sheet P is cut off the web while it is stationary, see Fig. 1. In cutting the print P from the web, a punch cooperates with two stationary die members to cut out an I-shaped slug 14 leaving round corners on the cutoff print P. The means (11, 12) for intermittently feeding the strip of prints forwardly into the die assembly may be of any known design so long as it permits feeding a given length of strip forwardly at each advance. For example, this feeding means may be hand operated or may be motor driven and of the type shown in U.S. Patent 2,742,963 wherein a roll, equivalent to roll 11, is rubber covered and constantly driven and another roll, equivalent to roll 12, is mounted on a pivoted arm to press the web into contact with the lower roll to advance the strip and be raised from the web to stop its movement. If the web being cut up is a strip of photographic prints separated by equal marginal areas 16, then the slug 14 to be cut out by the die assembly may be so sized as to cut out this entire area and leave borderless prints, as shown, or it may be sized so as to leave margins on each print.

Coming now to the construction of the die assembly 13, this assembly comprises a stationary supporting plate 20 which may be bolted, or otherwise fastened, to a table, or other supporting surface, by means of bolts, not shown, passing through holes 21 provided in wing portions 22 of the plate. The supporting plate is provided with a transverse slot 23, of the form best shown in Fig. 3, and front die member 24 and rear die member 25 are fastened to the top of the supporting plate 20 in any suitable manner as by soldering or welding, with their shearing edges extending into the slot 23 to define the I-shaped aperture, best shown in Fig. 3, which corresponds in shape and size to the I-shaped slug 14 adapted to be cut out of the strip, see Fig. 1. The top surfaces of the front and rear die members 24 and 25 are flush with one another and serve to support the strip of prints W as it is fed into the die assembly. Fastened to the lower side of the supporting plate 20 at the rear end thereof by bolts 26 are lower and center die supports 27 and 28, respectively, which give the assembly rigidity and provide means for locating a guide roller 29 below the rear die member and across which the web of prints is passed. This guide roller 29 forms a part of the print ejecting mechanism as will be hereinafter set forth.

Also fastened to the top of the rear end of supporting plate 20 at each side of the web path by bolts 26 are hinge members 30 having circular pintle portions 31. Cooperating with these hinge members 30 are second hinge members 32 having spaced pintle portions 33 embracing the pintle portion 31 of hinge member 30 and being connected thereto by hinge pins 34. A reciprocating punch carrier 35 has offset arms 36 fastened to the hinge members 32 by bolts 37 and roller pins 38, the pins 38 being provided to prevent any transverse movement of the punch carrier relative to the supporting plate as it is reciprocated relative thereto. The punch carrier 35 is reciprocated about its hinge connection with the supporting plate 20 by a pair of links 40, one at each side of the assembly, which are rotatably connected at one end to a shaft 41 carried by, and extending transversely of, the punch carrier. The other end of each link 40 is rotatably connected to a crank or eccentric 42, the crank shaft 43 of which is supported in spaced bearing blocks 44 fixed to the underside of supporting plate 20 by bolts 45, said crank shaft being driven by sprocket 46 fixed to one end of the shaft and being engaged by a chain 47.

Fixed to the underside of the hinged carrier 35 by a bolt 48 is a punch 49 which corresponds in shape and size to the I-shaped slug 14 shown in Fig. 1 and which passes between the fixed die plates 24 and 25 as the carrier is pulled down toward the supporting plate 20 to die out the I-shaped slug in question. When the carrier is moved upwardly, or away, from the stationary die members, its end is raised sufficiently above the die members to allow the strip of prints to be advanced across the dies by the desired amount. The drive for the punch carrier and the intermittent drive for the strip of prints are so synchronized that the punch moves down to cut off a print during the time the strip is stationary, and the strip drive does not commence until the punch is raised far enough from the dies to allow the strip to pass freely therebetween.

After a print is cut off from the strip, it must be ejected from the die assembly in order to permit an unobstructed advance of the next print on the strip into the die assembly. To this end, we have provided an automatic print or sheet-ejecting mechanism which forcefully ejects a cutoff print from the die assembly the instant it is cut off the strip, thus making way for a free advance of the strip of prints into the die assembly. It is this ejector mechanism and its combination with the die assembly which is considered to constitute the novel features of the present invention.

Referring now to Figs. 3–6, this ejector mechanism will be described in detail. Extending transversely across the die assembly behind the rear die member 25 and fixed to the top of the stationary hinge elements 30 in spaced relation with the rear die member 25 by bolts 26, to permit passage of a cutoff print, is a stationary plate 51. Struck up from this plate is a pair of perforated ears 52 which support a rod 53 which extends transversely of the die assembly and on which a U-shaped bracket 54 is pivotally mounted to move toward and away from the stationary dies 25 and 24 and hence the path of the strip of prints. The ends of bracket 54 carry a print-ejecting roller assembly, designated generally at 55, see Fig. 5, and which includes a stub shaft 56 rotatably supported by the bracket arms and on which a rubber covered roller 57 is rotatably mounted. An arcuate gear segment or rack 58 bolted to the underside of the punch carrier 35, see Fig. 4, meshes with a pinion 59 fixed to the end of the shaft 56, thereby holding the roller assembly 55, and roller 57 thereof, off the strip of prints when the punch carrier 35 is in its "up" position. When the punch carrier starts its downward movement, it allows or causes the roller assembly 55 to bodily move down through pivotal movement of bracket 54 on shaft 53 until roller 57 engages the print to be cut off. The strip, being stationary at this time, prevents the roller 57 from turning so that continued downward movement of the punch carrier causes the gear segment to rotate the pinion 59 with respect to the roller, thereby winding a coiled spring 60 fastened at one end 61 to the roller and at its other end 62 to a collar 63 fixed to the shaft 56 by a set screw 64. The instant the print is cut off, the spring-loaded roller 57 is free to turn under the action of coiled spring 60 and in so turning, forcefully ejects the cutoff print from the die assembly. Looking at Fig. 4, it will be noted that roller 29 engages the underside of the print to be cut off directly beneath ejector roller 57, and this roller 29 is provided solely to reduce friction opposing any ejecting movement of the cutoff print.

When the punch carrier 35 starts its upward movement, the gear segment 58 fixed thereto will rotate the roller assembly 55 until a pin 65 extending transversely from a collar 66 fixed to shaft 56 by a set screw 67 hits a stop, which in this instance is one arm of the bracket 54, see Fig. 4. Since the upward movement of the gear segment can no longer rotate pinion 59, it lifts the entire roller assembly, including roller 57, from the path of the strip of prints, thus providing clearance for the next strip advance. The extreme upward movement of the roller assembly 55 may be limited by a stop lug 70 fixed to the stationary plate 51 and extending into the path of one arm of the bracket 54. The tension of the coiled spring 60 is preset in assembly by adjustment of collar 63 on shaft 56. A cutaway roller 71 adjustably fixed on the end of shaft 56 by a set screw 72, see Figs. 5 and 6, cooperates with a pin 73 extending from the end of ejector roller 57 to prevent the spring from unwinding completely and limits the rotation of the roller.

While we have shown and described our invention as applied to the problem of cutting photographic prints with round corners from a continuous strip of prints, it will be appreciated by those skilled in the art that invention is not limited to such an application. It could just as well be used for cutting sheets of a given size and shape from any sort of continuous web so long as the cutoff operation requires the use of dies, rather than shear blades, where it is necessary, or desirable, to eject the cutoff sheet from the die assembly to clear the way for a subsequent advance of the web into the die assembly. As clearly set forth above, a unique feature of the present sheet-ejecting mechanism is that no separate brake is required for the ejector roller which must come into play at the time the driving spring for the roller is to be tensioned. In the present sheet-ejecting mechanism this braking action is accomplished by providing the surface of the ejector roller with rubber, or other friction-inducing material, which when moved into engagement with the sheet to be cut off opposes relative movement between the sheet and the roller. This not only provides the necessary brake for the roller during tensioning of its driving spring, but insures positive and quick ejection of the sheet the instant it is severed, and then with only a partial rotation of the ejecting roller being required.

Although we have shown and described certain specific embodiments of the present invention, we are aware that many modifications thereof are possible. Our invention, therefore, is not to be limited to the precise details of construction shown and described, but is intended to cover all modifications coming within the scope of the appended claims.

Having thus described our invention, what we claim as new and desire to secure by Letters Patent of the United States is:

1. The combination with a die assembly for cutting sheets from a continuous web of material intermittently advanced thereto comprising a stationary support; a stationary die member fixed to said support across the top of which the web is advanced; a punch carrier reciprocally mounted to move to and from said support; a punch carried by said carrier and adapted to cooperate with said die member to cut sheets from the end of said web; means for intermittently reciprocating said punch carrier in synchronism with the intermittent feed of said web to cut a sheet from the end of said web when it is stationary; of a sheet ejector mechanism associated with said assembly for automatically ejecting a sheet from the assembly as soon as it is cut from the web to make way for the successive feeding of the web into said assembly, and comprising an ejecting roller mounted on said stationary support to move to and from contact with that portion of the web fed into the assembly and which is adapted to be cut off, said roller having a friction surface which resists relative motion between the web and the roller when they are in contact; a spring for rotating said roller in a direction to move the cut sheet from the die assembly when tensioned; means for moving said roller away from the path of said web as the punch carrier is raised and into contact with the sheet to be cut off of said web when the carrier is lowered; and means for tensioning said spring during downward movement of said carrier and after the roller has contacted said web, whereby as soon as a sheet is cut off from the web the spring is free to rotate said roller to eject the sheet from the assembly.

2. A combined die assembly and ejecting mechanism according to claim 1, characterized by the fact that there is a mechanical drive connection between the ejecting roller and the punch carrier whereby movement of the punch carrier away from and toward said support moves said ejecting roller away from and into contact with the web, respectively, said mechanical drive connection also acting to tension said spring during downward movement of said carrier and after the roller engages said web.

3. A combined die assembly and ejecting mechanism according to claim 1, characterized by the fact that the means for moving said ejecting roller away from and toward the path of said web and tensioning the driving spring for said roller comprises a pinion associated with said roller and a gear member fixed to said punch carrier to move therewith and engaging said pinion.

4. The combination with a die assembly for cutting sheets from a continuous web of material intermittently advanced thereto comprising a stationary support; a stationary die member fixed to said support across the top of which the web is advanced; a punch carrier reciprocally mounted to move to and from said support; a punch carried by said carrier and adapted to cooperate with said die member to cut sheets from the end of said web; means for intermittently reciprocating said punch carrier in synchronism with the intermittent feed of said web to cut a sheet from the end of said web when it is stationary; of a sheet-ejecting mechanism associated with said assembly for automatically ejecting a sheet as soon as it is cut from the web and comprising a shaft, a rubber-covered ejecting roller rotatably mounted on said shaft; a bracket rotatably supporting said shaft and pivotally connected to said support to allow said shaft and roller to move bodily to and from the path of said web where said roller contacts the end of the web to be severed; a coiled spring surrounding said shaft and having one end fixed to said shaft and the other fixed to said roller and adapted when tensioned to drive said roller in a direction to eject a sheet from said die assembly; a pinion fixed to said shaft; means for limiting rotation of said roller on said shaft; means for limiting rotation of said shaft relative to its supporting bracket; and a gear rack fixed to said punch carrier and engaging said pinion and adapted to bodily pivot said shaft to and from the web path as said punch carrier reciprocates and to tension said coiled spring during the downward movement of said carrier and after the roller has engaged the end of the web to be severed.

References Cited in the file of this patent

UNITED STATES PATENTS

| | | |
|---|---|---|
| 1,363,102 | Ferrel | Dec. 21, 1920 |
| 1,486,561 | Belisle | Mar. 11, 1924 |
| 1,860,668 | Gillet | May 31, 1932 |